Sept. 7, 1926.  
H. BLOUNT ET AL  
1,598,845

REEL

Filed Dec. 29, 1922

Inventors  
Harry Blount  
John N. Selvig  
by H.A. Pattison  
Atty.

Patented Sept. 7, 1926.

1,598,845

UNITED STATES PATENT OFFICE.

HARRY BLOUNT, OF OAK PARK, AND JOHN NILSEN SELVIG, OF CHICAGO, ILLINOIS, ASSIGNORS TO WESTERN ELECTRIC COMPANY, INCORPORATED, OF NEW YORK, N. Y., A CORPORATION OF NEW YORK.

REEL.

Application filed December 29, 1922. Serial No. 609,621.

An object of the invention is to provide a reel so constructed that whenever there is a difference in speed between the reel and the strand being fed thereto or drawn therefrom and the strand becomes loose or tight on the reel, it will not become tangled or subjected to tension that might cause a breakage thereof.

Another object of the invention is to provide an adjustable braking mechanism for a reel which is entirely housed within the reel and adapted to be adjusted through a relatively small opening formed in the cap member of the reel so that the body portion of the reel will present a relatively smooth surface.

A reel made in accordance with the present invention comprises a drum suitably rotatably supported, the drum having an outwardly flared portion adjacent its upper end which serves to prevent the strand from riding upwadly off the drum; and a lateral flange adjacent its lower end positioned flush with the floor or other surface to which the reel is attached, so that whenever there is a difference in speed between the reel and the strand, and the latter is caused to loop outwardly from the drum, as the reel and the strand approach the same speed and the loop is taken up, it will be guided by the said flange back onto the drum without tangling or breakage thereof. An adjustable braking mechanism is housed within a depression formed in the upper surface of the reel which is adapted to be readily adjusted through an opening formed in a cover member, the brake preventing the reel from rotating too freely on its bearings.

The reel herein disclosed is particularly designed for use with wire or rod working apparatus, but may be adapted for other uses and the invention is only to be limited by the scope of the appended claims.

The drawings illustrate one embodiment of the invention, in which.

Figure 2:
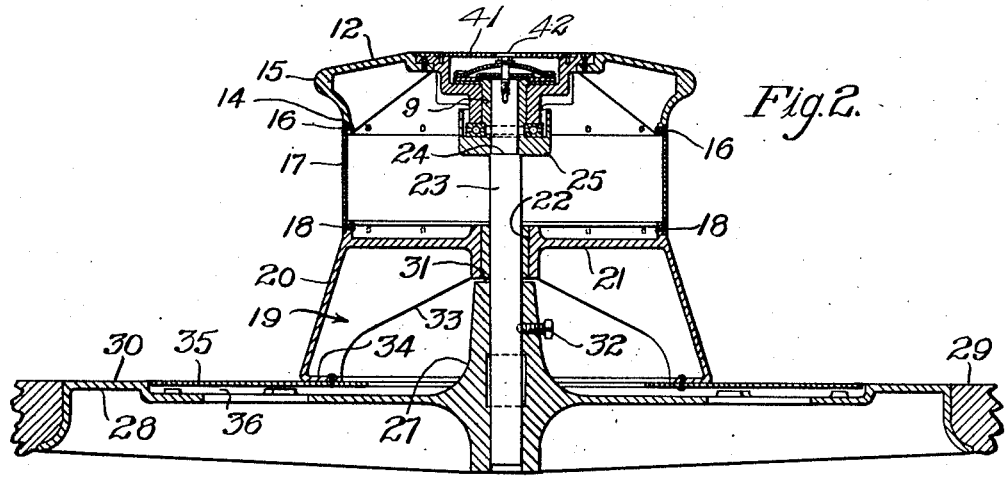
Fig. 2 is an enlarged vertical sectional view taken on the line 2—2 of Fig. 1.
Figure 3:
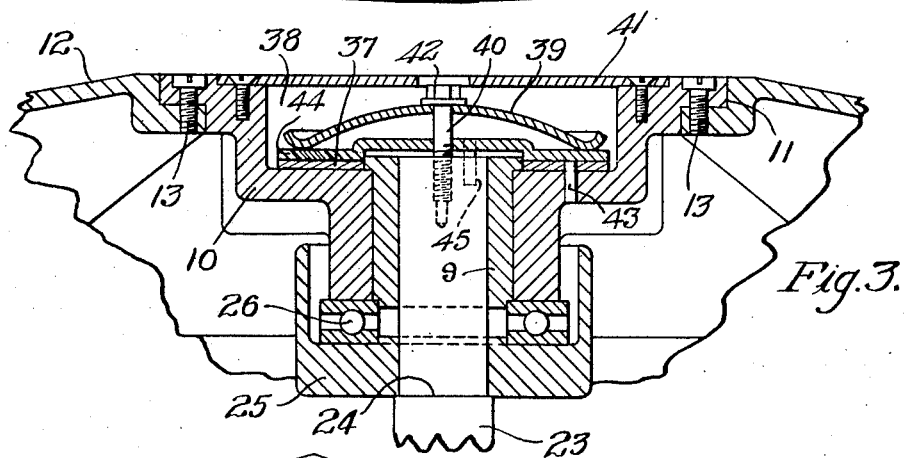
Fig. 3 is an enlarged detail view of a portion of Fig. 2.
Figure 1:
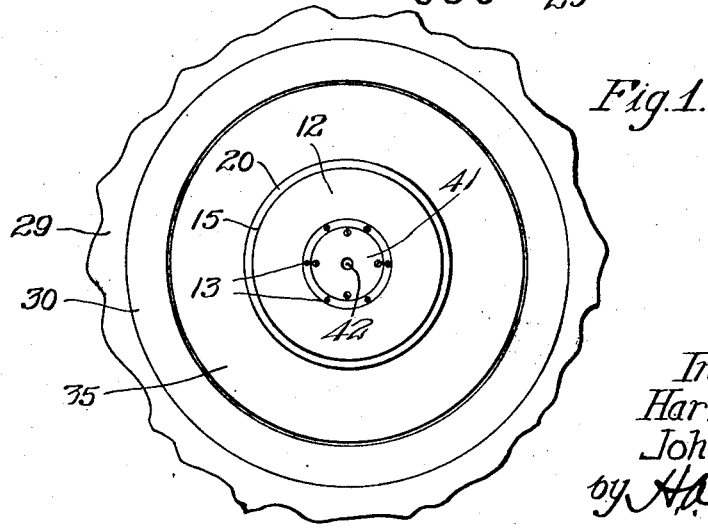
Fig. 1 is a top plan view of a reel embodying the invention.

Referring now to the drawings in detail in which like reference numerals designate similar parts throughout the several views, 10 represents the hub of the reel provided with a central aperture within which is mounted a bearing sleeve 9 preferably composed of bronze. At its upper end the hub 10 is provided with an annular flange 11 to which a cap member 12 is secured by means of suitable fastenings, such as bolts 13. The cylindrical cap member 12 is cast to have the shape shown, comprising a top and perpendicular side wall 14 connected by a flange or beeding 15, the purpose of which will be hereinafter described.

Secured to the perpendicular wall 14 by means of bolts or rivets 16 is a drum member 17 formed of sheet metal. The lower edge of this drum is secured by rivets 18 to an annular lip formed on a cylindrical base member 19. The member 19 is a casting having an inclined peipheral wall 20 and a horizontal web portion 21 provided with a central aperture constituting a bearing 22.

The reel is rotatably mounted on a vertically disposed shaft 23, the upper end of the shaft being journaled within the bearing sleeve 9, said shaft passing through the bearing in the web portion 21 and being provided with a shoulder 24 to support a cup shaped member 25. Mounted in the member 25 is a thrust bearing 26 of any suitable type, upon which the inner edge of the hub 10 rests. The shaft 23 is supported in a socket 27 made integral with a platform 28. This platform is mounted within a suitable depression in the floor 29 or other surface to which it is attached, in such position that the upper surface 30 of the platform is flush with the floor or surface 29. The shaft 23 is adjusted in the socket 27 so as to afford a clearance space 31 between the socket and bearing portion of the web 21, as shown in Fig. 2, the shaft being locked in its set position by means of a set screw 32.

From the above description it will be understood that the entire reel is supported by the thrust bearing 26 and rotates thereon.

The base member 19 is provided with strengthening ribs 33 and also with an annular horizontally disposed flange 34 to which is secured a ring 35. This ring is horizontally disposed and is rotatable withing a depressed portion 36 formed in the platform 28, so that its upper surface is flush with the surface 30 of said platform.

In order to prevent the reel from rotating too freely on the bearing 26 when a strand is being drawn from the reel a suitable braking means is provided. It will be evident that in operation the pull upon the free end of the strand carried upon the reel causes the ring 35, base member 19, drum member 17, and cap member 12 with the hub 10 to revolve as a unit about the shaft 23. Secured to rotate with the hub 10 within a cup shaped recess 38 formed therein is a friction ring 37 which is secured to the hub 10 by a dowel pin 43. A non-rotatable disk 44 is secured to the stationary shaft 23 by a dowel pin 45 and is held in frictional engagement with the ring 37 to provide a braking action between the ring and disk, by a cup spring 39 which engages the upper surface of the disk 44. The pressure of the spring 39 against the disk 44 to obtain the desired friction between the ring 37 and the disk 44 and consequently the desired braking effect against the free rotation of the reel may be adjusted by turning a screw 40 threaded in the upper end of the stationary shaft 23. A plate 41 is provided for covering the braking mechanism, the plate fitting upon a shouldered surface formed in the hub 10 to present a flush surface at the top of the reel. The cover plate 41 is provided with an opening 42 whereby a suitable wrench or tool may be inserted there-through to adjust the screw 40.

During the operation of the reel, should it for any reason be caused to rotate more rapidly than the speed at which the strand is being drawn therefrom or fed thereto and the strand is caused to loop out away from the reel, it will rest either on the flange 35, the surface 30 of the platform 28, or the adjacent floor 29, depending upon the size of the loop formed. Since the flange 35 and surfaces 30 and 29 are all flush, as the reel and strand approach the same speed and the loop is taken up, the strand has an uninterrupted path over the surfaces 29 and 30 and flange 35 back to the reel and is therefore not tangled or put under undue tension, which might tend to break it.

By providing the beading 15 on the cap member 12, any tendency of the strand to creep upwardly off the reel is prevented.

What is claimed is:—

1. A reel comprising a body portion, a member upon which said body portion is rotatably mounted, said body portion provided with a shouldered opening at one end, and means mounted on the member within the shouldered opening and bearing against said body portion to apply a braking force thereto.

2. A reel comprising a body portion, a member upon which said body portion is rotatably mounted, said body portion provided with a shouldered opening at one end, means mounted on the member within the shouldered opening and bearing against said body portion to apply a braking force thereto, and other means within the shouldered opening for varying the braking force of said first mentioned means against said body portion.

3. A reel comprising a body portion, a member upon which said body portion is rotatably mounted, said body portion provided with a shouldered opening at one end, means mounted on the member within the shouldered opening and bearing against said body portion to apply a braking force thereto, other means within the shouldered opening for varying the braking force of said first mentioned means against said body portion, and a cover member for the shouldered opening in said body portion provided with an opening adapted to allow the latter means to be adjusted without the removal of the cover member.

4. A reel comprising a body portion having a flange adjacent its lower end, means for rotatably supporting said body portion comprising a cup shaped base member having a vertically extending central sleeve portion, a vertical stud adjustably mounted therein, the said body portion being rotatably supported upon the upper end thereof in such manner that said flange is positioned within the depression formed in said member with the upper surface of the flange flush with the upper surface of the member surrounding the depression.

5. A reel comprising a body portion, an axle upon which said body portion is rotatably mounted, said body portion provided with a shouldered opening at one end, means adjustably mounted on the axle within the shouldered opening and bearing against said body portion to apply a braking force thereto, and a cover member for the shouldered opening provided with an opening adapted to allow said means to be adjusted without the removal of the cover member.

6. A reel comprising a body portion including a cap member provided with a shouldered opening, a base member having a flange and an intermediate drum member, means for supporting said body portion comprising a member provided with an annular depression, an axle upon which said body portion is rotatably supported in such a manner that said flange is positioned within the depression formed in said member, means adjustably mounted on the axle within the shouldered opening in the cap member and bearing against said cap member to apply a braking force to said body portion and a cover member for the shouldered opening in the cap member provided with an opening adapted to allow said means to be adjusted without the removal of the cover member.

In witness whereof, we hereunto subscribe our names this 14th day of December A. D., 1922.

HARRY BLOUNT.
JOHN NILSEN SELVIG.